United States Patent [19]
Konno et al.

[11] Patent Number: 6,075,695
[45] Date of Patent: Jun. 13, 2000

[54] MOUNTING STRUCTURE OF MAGNETIC DISK DRIVE INTO MAIN BODY OF COMPUTER

[75] Inventors: Makoto Konno; Hisashi Shibata, both of Yamagata, Japan

[73] Assignee: Mitsumi Electric Co., Ltd., Tokyo, Japan

[21] Appl. No.: 09/026,553

[22] Filed: Feb. 20, 1998

[30] Foreign Application Priority Data

Feb. 21, 1997 [JP] Japan ................................. 9-037363

[51] Int. Cl.[7] .................. G06F 1/16; H05K 5/00
[52] U.S. Cl. .......................... 361/685; 361/725
[58] Field of Search .................. 361/683, 685, 361/725, 727; 312/223.2; 364/708.1

[56] References Cited

U.S. PATENT DOCUMENTS

| | | | |
|---|---|---|---|
| 4,945,435 | 7/1990 | Boigenzahn et al. | 360/97.01 |
| 5,327,323 | 7/1994 | Yeom et al. | 361/685 |
| 5,414,574 | 5/1995 | Boutaghou et al. | 360/97.01 |
| 5,564,804 | 10/1996 | Gonzalez et al. | 312/223.2 |
| 5,768,099 | 6/1998 | Radloff et al. | 361/685 |
| 5,828,547 | 10/1998 | Francovich et al. | 361/685 |

FOREIGN PATENT DOCUMENTS 9-82076  3/1997  Japan .

*Primary Examiner*—Leo P. Picard
*Assistant Examiner*—John D. Reed
*Attorney, Agent, or Firm*—Whitham, Curtis & Whitham

[57] ABSTRACT

A mounting structure of a magnetic disk drive into a main body of computer is disclosed. The mounting structure comprises a lower frame of the magnetic disk drive including a bottom plate and a pair of side walls, and four cantilevered arms provided near front and rear ends of the pair of side walls, each of the cantilevered arms includes a continued portion connecting with each of the side walls at one point, a plurality of bent portions, a free end portion, and at least one screw hole for fixing onto the main body of computer by screws, the cantilevered arms are arranged so as to be that directions of bending stresses derived from screw-tightening torques and acting to the continued portions of the cantilevered arms are accorded with each other. The mounting structure further comprises a reinforcing plate disposed under the bottom plate of lower frame, at least two parts of the reinforcing plate respectively support one of the bent portion in two of the cantilevered arms located on at least one diagonal line of the lower frame from downward thereof.

22 Claims, 3 Drawing Sheets

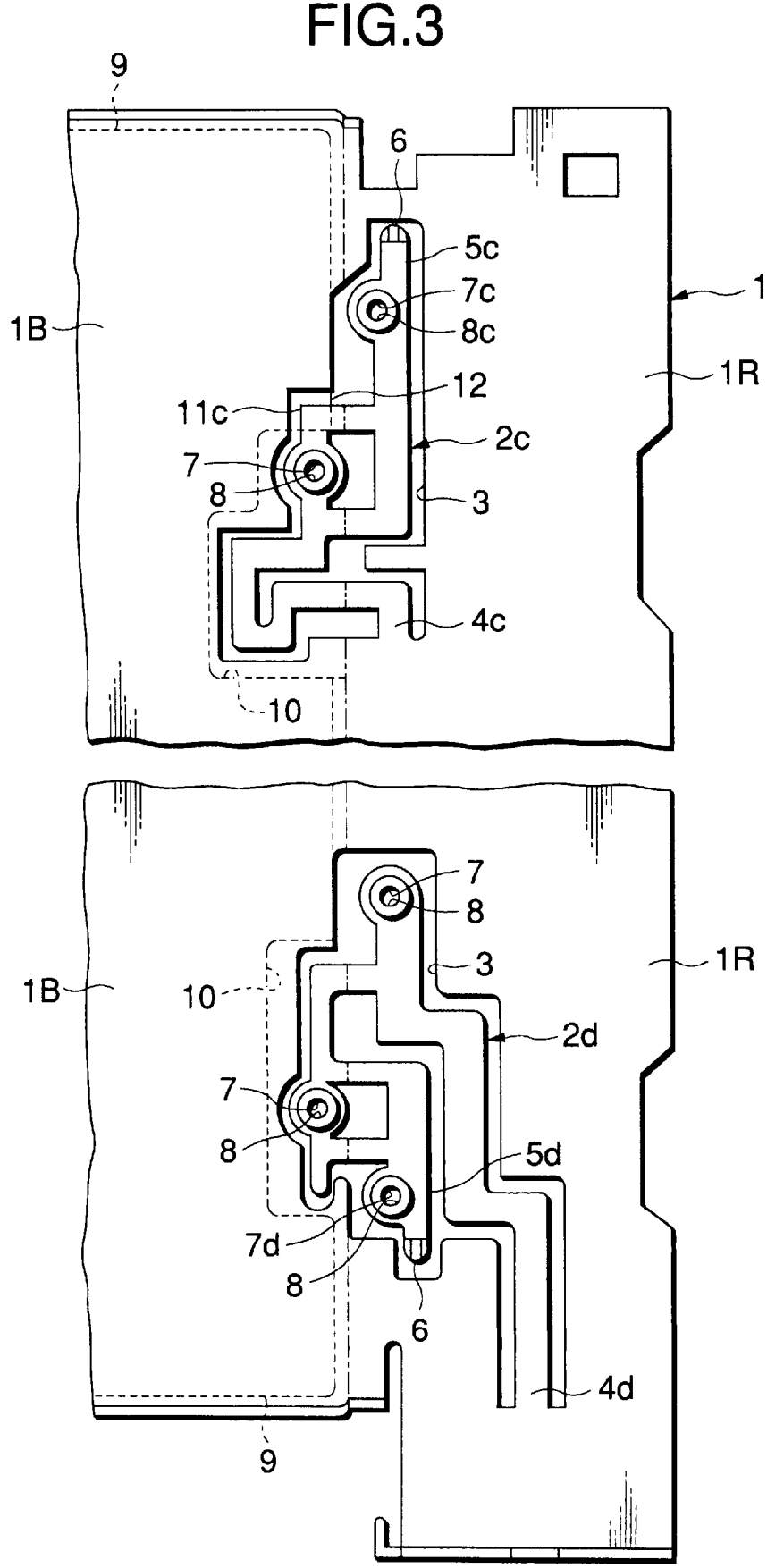

MOUNTING STRUCTURE OF MAGNETIC DISK DRIVE INTO MAIN BODY OF COMPUTER

BACKGROUND OF THE INVENTION

1. Technical Field of the Invention

The present invention relates to a magnetic disc drive which is utilized as a backing storage device of a computer. Specifically, it relates to a mounting structure of a built-in type magnetic disk drive onto main body of the computer.

2. Background of the Related Art

Conventionally, a main body of a computer has an opening forming an accommodating space for receiving a disk drive. The disk drive is inserted into the space and then fixed to the main body by screws. During this installation process, screw-tightening torques often cause position discordance to occur between the disk drive and the main body or the like, thereby causing a frame of the disk drive to become distorted. The distortion of the frame adversely affects the disk drive, for instance, by causing deviations in the accuracy of head positioning, deviations in a center of the DD motor, and so on. Moreover, even if the mounting is not distorted, external vibrations or impacts often impinge on the magnetic disk drive directly, thereby causing the magnetic head and/or the magnetic disk to become damaged.

SUMMARY OF THE INVENTION

To solve the aforementioned problem, according to the present invention, there is provided a mounting structure of a magnetic disk drive adapted for assembly into a main body of a computer, which mounting structure comprises a lower frame of the magnetic disk drive including a bottom plate, a pair of side walls, and four cantilevered arms provided near front and rear ends of the pair of side walls. Each of the cantilevered arms includes a continued portion connected to respective side walls at one point, a plurality of bent portions, a free end portion, and at least one screw hole for allowing the mounting structure to be fixed to the main body of the computer by screws. The cantilevered arms are arranged so as to be in directions of bending stresses derived from screw-tightening torques, and so that the ending stresses acting on the continued portions of the cantilevered arms are in accordance with each other.

According to another aspect of the present invention, the mounting structure further comprises a reinforcing plate disposed under the bottom plate of the lower frame. At least two parts of the reinforcing plate respectively support one of bent portions in two of the cantilevered arms located on at least one diagonal line of the lower frame from downward thereof.

BRIEF DESCRIPTION OF THE DRAWINGS

In accompanying drawings:

FIG. 3 is a plan view of right side portion of the lower frame, in which right side wall of the lower frame shown in FIG. 1 is unfolded, and wherein a chain line indicated a boundary between the bottom plate and the right side wall.

DETAILED DESCRIPTION OF THE EMBODIMENT

Figure 1:
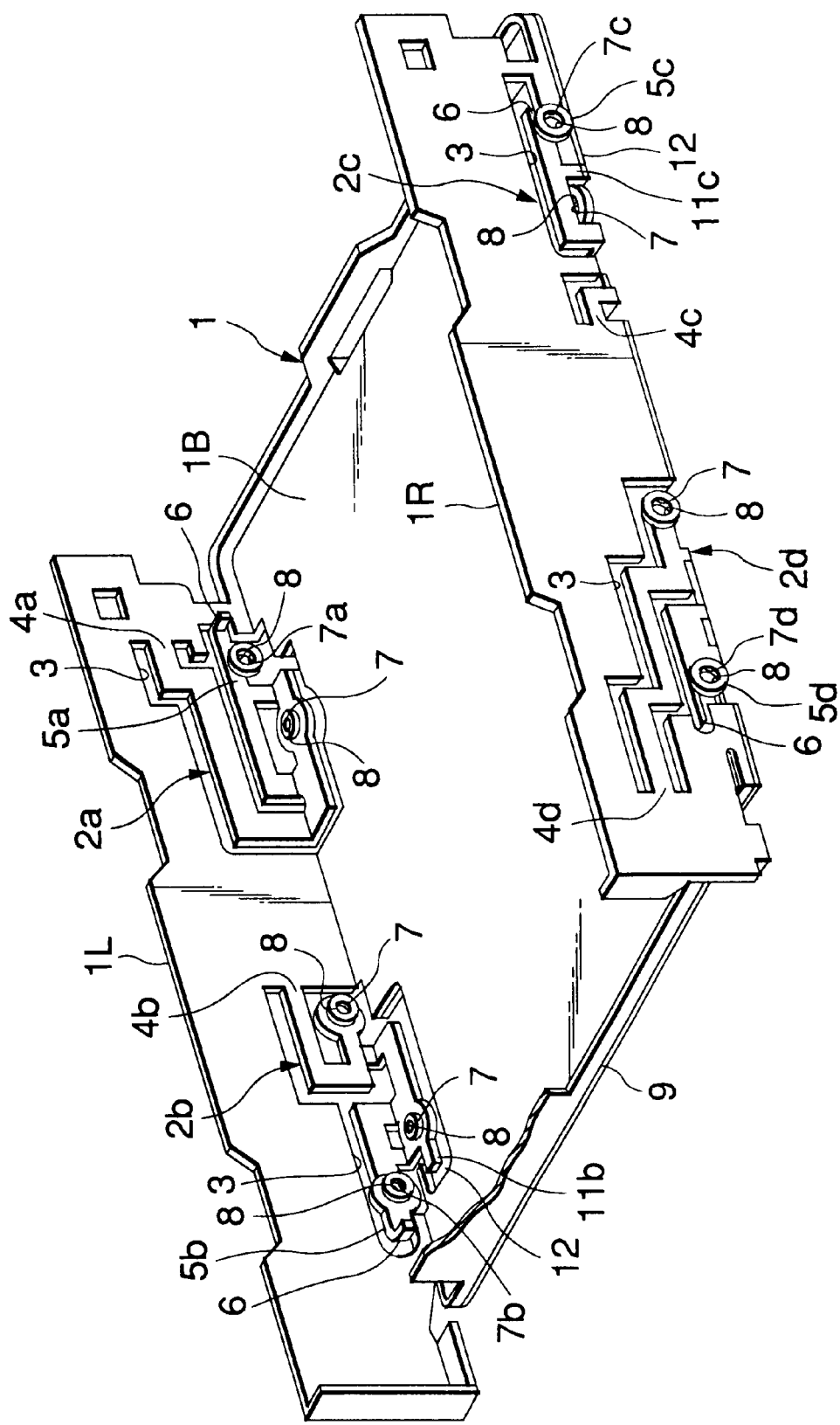
FIG. 1 is a perspective view showing one embodiment of the present invention, including a lower frame of a magnetic disk drive viewed from a upper-rear-right side thereof.

Now, descriptions will be given below in detail of one embodiment of the present invention with reference to FIGS. 1 to 3. FIG. 1 is a perspective view of a lower frame 1 of a magnetic disk drive viewed from an upper-rear-right side. The lower frame 1 is made of a steel plate and is formed by press molding. Side walls 1L, 1R are provided respectively at a left end and a right end of a rectangular bottom plate 1B (in a plan view).

Although a representation is omitted, a drive mechanism, a head positioning mechanism, or the like for the magnetic disk are mounted inside the lower frame 1, and an upper frame is enclosedly disposed thereabove. In addition, a front bezel is disposed in front thereof (in FIG. 1, right side). The disk drive, thus formed in a shape of rectangular box, is inserted into an accommodating space in the main body of a computer, only the front bezel of which is exposed at a front face of the main body of computer. The magnetic disk drive is inserted or ejected at the front bezel.

In a front and rear of both side walls of the lower frame 1, four cantilevered arms 2a, 2b, 2c, 2d are provided when the lower frame 1 is formed by punching out a steel plate, the cantilevered arms 2a, 2b, 2c, 2d are uniformly formed with the lower frame body 1 by means of slits 3 that are opened up at predetermined portions along outlines of the cantilevered arms 2a, 2b, 2c, 2d.

Figure 2:
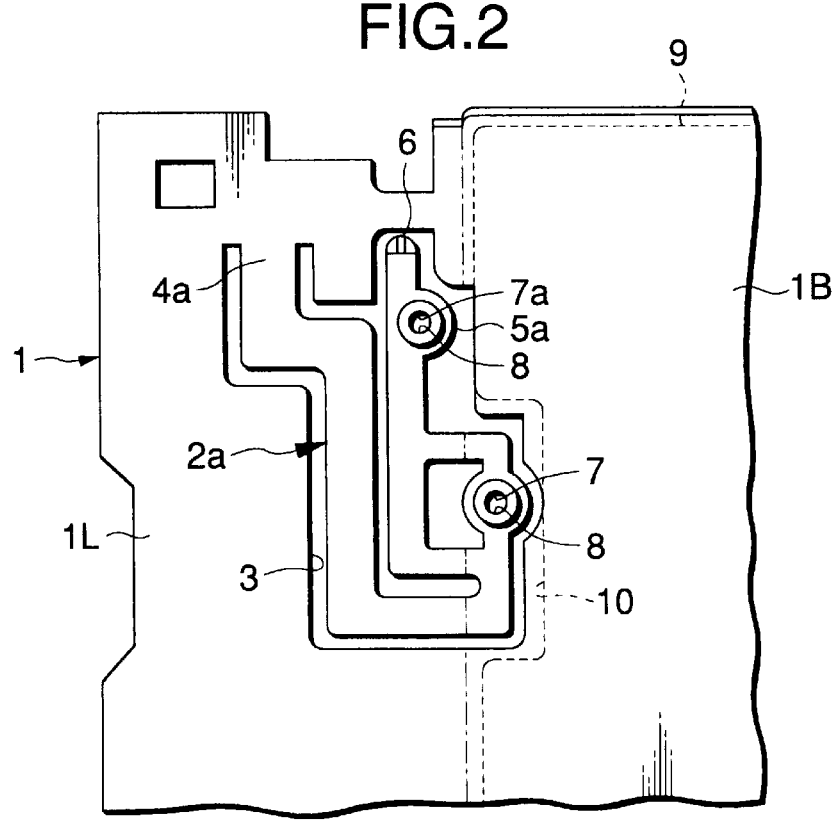
FIG. 2 is a plan view of left side portion of the lower frame, in which a left side wall of the lower frame shown in FIG. 1 is unfolded, and wherein a chain line indicates a boundary between a bottom plate and the left side wall.
Figure 2:
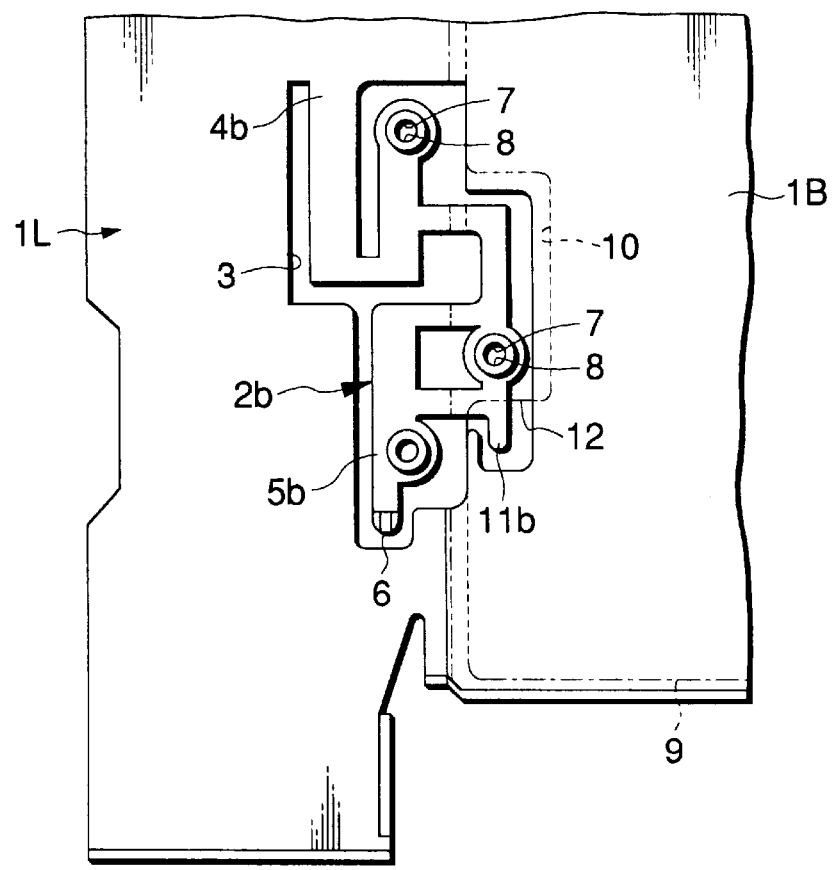

As shown in FIGS. 2 and 3, slits 3 are opened up so as to step across boundaries between the bottom plate 1B and both side walls 1L, 1R respectively and so as to surround the cantilevered arms 2a, 2b, 2c, 2d; thereby the arms 2a, 2b, 2c, 2d are edged and separated from the lower frame body 1. Each of the arms 2a, 2b, 2c, 2d is connected to only one point of the left side wall 1L or the right side wall 1R, and extends from the continued portions 4a, 4b, 4c, 4d cantileverly.

Here, the continued portion 4a of the front-left cantilevered arm 2a is located near front end of the left side wall 1L and the continued portion 4d of the rear-right cantilevered arm 2d is located near a rear end of the right side wall iR, and both arms 2a, 2d extend toward central portions of the side walls 1R, 1R respectively. On the other hand, the continued portion 4b of the rear-left cantilevered arm 2b and the continued portion 4c of the front-right cantilevered arm 2c are located near central portions of the side walls iL, iR respectively, and the arm 2b extends toward rear end of the left side wall 1L, the arm 2c extends toward front end of the right side wall 1R.

Also, each of cantilevered arms 2a, 2b, 2c, 2d has many bending portions and several junctions, some of which extend inside the bottom plate 1B. Further, each of the cantilevered arms terminate in end portions 5a, 5b, 5c, 5d. Mi the end portions are free ends which are located near the front or rear end of the left or right side wall 1L, 1R.

Hence, in the rear-left side arm 2b and the front-right arm 2c, the continued portions 4b, 4c are provided near the central portions of side walls 1L, 1R and the end portions 5b, 5c are provided near the front or rear end thereof. On the other hand, in the front-left arm 2a and the rear-right arm 2d, both of the continued portions 4a, 4d and the end portions 5a, 5d are located near the front or rear end of side walls 1L, 1R.

Besides, all of the tip ends of end portions 5a, 5b, 5c, 5d are bent toward inside of the lower frame 1 (see FIGS. 2 and 3) to form pawl portions 6. When the cantilevered arms 2a, 2b, 2c, 2d are bent by screw-tightening (will be described later), the pawl portions 6 engage edges of the surrounding lower frame 1 and thereby prevent the arms 2a, 2b, 2c, 2d from bending too much.

Further, in the end portions 5a, 5b, 5c, 5d, there are provided ring bar portions having through holes 7a, 7b, 7c, 7d, and female threads 8 are tapped on an inner peripheral face of the through holes 7a, 7b, 7c, 7d. Also, similar through holes 7 are provided on intermediate portions of the cantilevered arms 2a, 2b, 2c, 2d. On both front arms 2a, 2c, only one hole is respectively provided in the bottom plate 1B side, and on the both rear arms 2b, 2d, one hole is provided in each of the bottom plate side and the side wall 1L or 1R side, respectively. The female threads 8 are tapped also inside of the through holes 7.

For manufacturing the lower frame 1, following steps are necessary: punching out the slits 3 having complex shapes, bending, cutting and erecting, tapping and so on. Hence, it is better to use thinner steel plate to improve operational efficiency and to reduce costs. However, since the thinner plate tends to distort, new problems are occurred. In view of this, there is disposed a reinforcing plate 9 under the bottom plate 1B of the lower frame 1. In the reinforcing plate 9, gaps 10 are formed so as to provide clearance for the cantilevered arms 2a, 2b, 2c, 2d. There are also provided extended portions 12 under end portions 11b, 11c which are respectively formed in the rear-left arm 2b and the front-right arm 2c at which the arms 2b, 2c are placed in the bottom plate 1B side.

When the magnetic disk drive is inserted into the accommodating space of the main body of a computer, a plurality of through holes provided on a frame forming the accommodating space are met with the through holes 7 (including 7a, 7b, 7c, 7d) one by one. Then, from outside of the frame, screws (right screws) are inserted into the accorded through holes and secured with the female threads 8, thereby the magnetic disk drive is mounted into the main body of computer.

During mounting, screw-tightening torques directed clockwise act on the through holes 7. Advantageously, since the cantilevered arms 2a, 2b, 2c, 2d have sufficient length, the screw-tightening torques can be almost absorbed by deformation of the arms. However, it is also possible that part of these stresses propagate to the lower frame body 1 via the continued portions 4a, 4b, 4c, 4d. Here, because the horizontal component of the stress resides along the bottom plate 1B of the lower frame 1, shear stress is negligible because the shear resistance of the bottom plate 18 is much larger than the shear stress.

However, the vertical component of the stress with regard to the bottom plate 1B may possibly cause distortion of bottom plate 1B. Namely, if the bending stresses propagating from the opposed cantilevered arms (front-rear, left-right, and diagonal) to the bottom plate 1B are directed in reverse, torsional moments act on the bottom plate 18. Since stiffness of the bottom plate 1B against the torsional moment is not so high, the distortion can occur.

Sources of the bending stresses include the screw secured through the through holes 7 (including 7a, 7b, 7c, 7d). In this embodiment, viewing from outside the side walls 1L, 1R, every continued portion 4a, 4b, 4c, 4d is located on the left side of every cantilevered arm 2a, 2b, 2c, 2d. Thus, if the clockwise screw-tightening torques act on the through holes 7, every vertical component of the stress applying to the continued portions 4a, 4b, 4c, 4d is directed upwards.

Hence, the directions of bending stresses acting on four corners of the bottom plate 1B are in accordance with each other, and consequently the torsional moment cannot be produced. Here, regarding the rear-left arm cantilevered arm 2b and the front-right cantilevered arm 2c, when the end portions 5b, 5c are turned downwards with regard to the lower frame body 1 by screw-tightening, the extended portions 12 of the reinforcing plate 9 support the end portions 5b, 5c and prevent the portions from turning downwards. Further, the stresses expected to propagate to the continued portions 4b, 4c are thereby led to the plate 9. Therefore, the bottom plate 1B cannot be distorted and thereby performance of the magnetic disk drive can be maintained.

Also, according to the present invention, various changes and modifications are possible without departing from the scope and spirit of the invention, and of course, the present invention can cover such changes and modifications.

As has been described heretofore, according to the present invention, due to fact that the lower frame is formed with the thin steel plate, and portions connected with the main body of computer are formed in cantilevered manner, the cantilevered arms can effectively absorb the vibrations or the distortion affecting directly the frame or the inner device of magnetic disk drive.

Furthermore, because the directions of stresses acting to four corners of the bottom plate are in accordance with each other, the torsional moment acting to the bottom plate cannot be produced.

According to another aspect of the present invention, because the cantilevered arms turned downwards with regard to the lower frame by the screw-tightening are supported from downward by the extended portions of the reinforcing plate, this not only prevents the arms from turning downwards but also leads the stresses, expected to propagate to the lower frame body, to the reinforcing plate.

In this manner, distortion of the lower frame can be reduced, and thereby the performance of magnetic disk drive can be maintained and reliability of the disk drive can be improved.

What is claimed is:

1. A mounting structure of a magnetic disk drive adapted for assembly into a main body of a computer, comprising:

a lower frame of the magnetic disk drive including a bottom plate and a pair of side walls; and at least one pair of cantilevered arms, said pair of cantilevered arms provided on the pair of side walls, respectively, each of said cantilevered arms including:

(a) a continued portion connected to a respective one of the side walls, (b) an end portion detached from said respective side wall and being free to vertically deflect relative to said continued portion, and (c) at least one screw hole for fixing the lower frame onto the main body of the computer by screws, wherein each of said cantilevered arms has an intermediate section connecting said continued portion to said end portion, and wherein at least a portion of said intermediate portion has a bend located in a same plane in which the bottom plate of said lower frame resides.

2. The mounting structure set forth in claim 1, wherein said cantilevered arms are connected to said side walls in such a manner that said cantilever arms deflect in a same direction when bending stresses derived from screw-tightening torques are applied to the continued portions of said cantilever arms.

3. The mounting structure set forth in claim 2, wherein, for each of said cantilever arms, said continued portion is located on a left side of said at least one screw hole as viewed from outside of said lower frame.

4. The mounting structure of the magnetic disc drive into the main body of computer as set forth in claim 3, said screw holes are used for right screw.

5. The mounting structure set forth in claim 1, further comprising:

slits provided in both of said bottom plate and said side walls of said lower frame, each of the slits defining a respective one of said cantilevered arms.

6. The mounting structure set forth in claim 5, wherein said free end portions of said cantilevered arms each has a pawl portion formed at respective tip ends of said free end portions.

7. The mounting structure set forth in claim 1, further comprising:

a reinforcing plate disposed under said bottom plate of said lower frame, parts of the reinforcing plate respectively supporting a bent portion included in each of the pair of said cantilever arms located on at least one diagonal line across the lower frame.

8. The mounting structure set forth in claim 1, wherein said lower frame is made of a thin steel plate.

9. The mounting structure set forth in claim 1, wherein said pair of cantilevered arms is provided at front ends of the side walls, respectively.

10. The mounting structure set forth in claim 1, wherein said pair of cantilevered arms is provided at rear ends of the side walls, respectively.

11. The mounting structure set forth in claim 1, wherein one arm in said pair of cantilevered arms is provided at a front end of one of the side walls and another arm in said pair of cantilevered arms is provided at a rear end of the other of the side walls, said one arm and said another lying along a diagonal line connecting corners of said bottom plate of said lower frame.

12. The mounting structure set forth in claim 1, further comprising:

a second pair of cantilevered arms disposed on the pair of side walls, respectively.

13. The mounting structure set forth in claim 1, wherein each arm in said pair of cantilevered arms includes an intermediate portion between said continued portion and said end portion, and wherein, for each arm in said pair of cantilevered arms, said at least one screw hole is located in said intermediate portion.

14. The mounting structure set forth in claim 13, wherein, for each arm in said pair of cantilevered arms, a second screw hole is located at said end portion.

15. The mounting structure set forth in claim 1, wherein each arm in said pair of cantilevered arms includes an intermediate portion between said continued portion and said end portion, and wherein, for each arm in said pair of cantilevered arms, said intermediate portion contains at least one bend so that said at least one screw hole is located adjacent said continued portion.

16. The mounting structure set forth in claim 1, wherein, for each arm in said pair of cantilevered arms, said at least one screw hole is located at said end portion.

17. The mounting structure of claim 1, wherein said bend contains a screw hole.

18. The mounding structure set forth in claim 6, wherein said pawl portions are bent so that said pawl portions engage respective edges of said lower frame, said respective edges thereby limiting an extent of deflection of said pair of cantilever arms when bending stresses derived from screw-tightening torques are applied to the continued portions of the cantilever arms.

19. The mounting structure set forth in claim 18, wherein each of said pawl portions are bent toward an inside of said lower frame.

20. The mounting structure set forth in claim 1, wherein, for each cantilevered arm in said pair of cantilevered arms, said continued portion is integrally formed with a respective side wall so as to form a unitary construction.

21. The mounting structure set forth in claim 1, wherein, for each cantilevered arms, said continued portion being connected to said respective side wall represents the only point where said cantilevered arm is connected to said side wall.

22. The mounting structure as set forth in claim 7, wherein said reinforcing plate is connected to said bottom plate in such a manner that bending stresses propagating to said continued portions are led to said reinforcing plate, to thereby prevent said bottom plate from being distorted by forces derived from said bending stresses.

* * * * *